March 27, 1951     M. D. POITTEVIN     2,546,699
MOVABLE DIAPHRAGM FOR RADIOSCOPIC APPARATUS
Filed Feb. 14, 1947     2 Sheets-Sheet 1
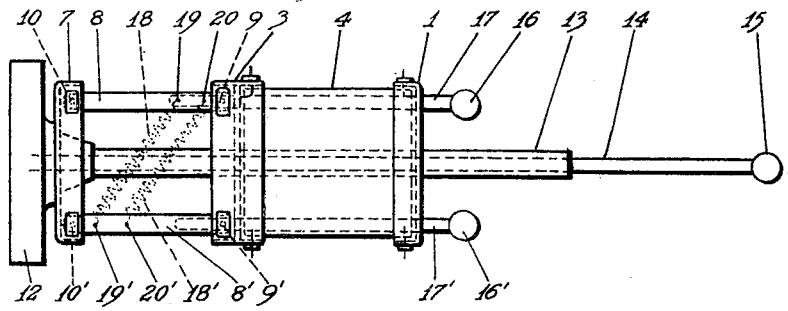
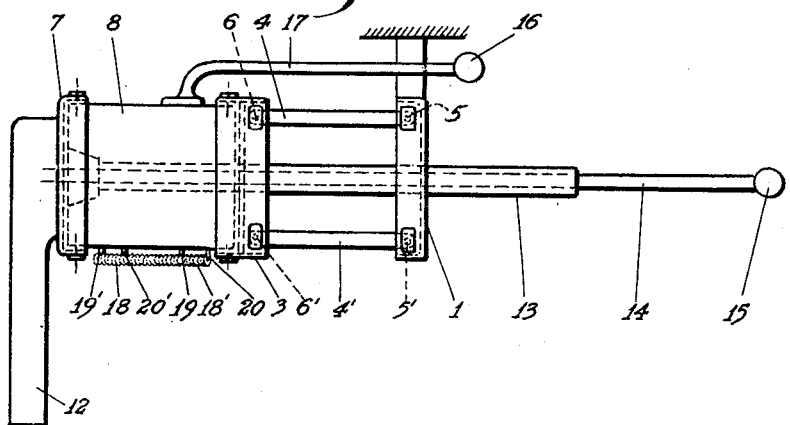
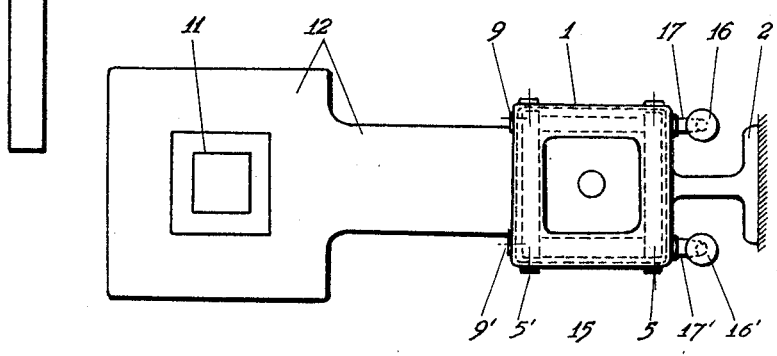
Maurice Poittevin
By Fraser, Myers & Manley
Atty's March 27, 1951     M. D. POITTEVIN     2,546,699
MOVABLE DIAPHRAGM FOR RADIOSCOPIC APPARATUS
Filed Feb. 14, 1947     2 Sheets-Sheet 2
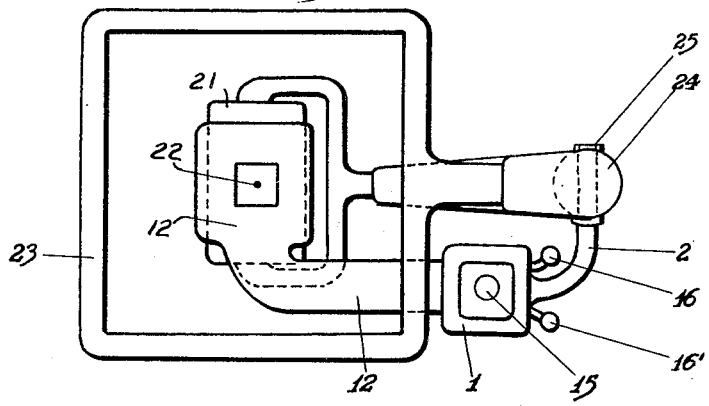
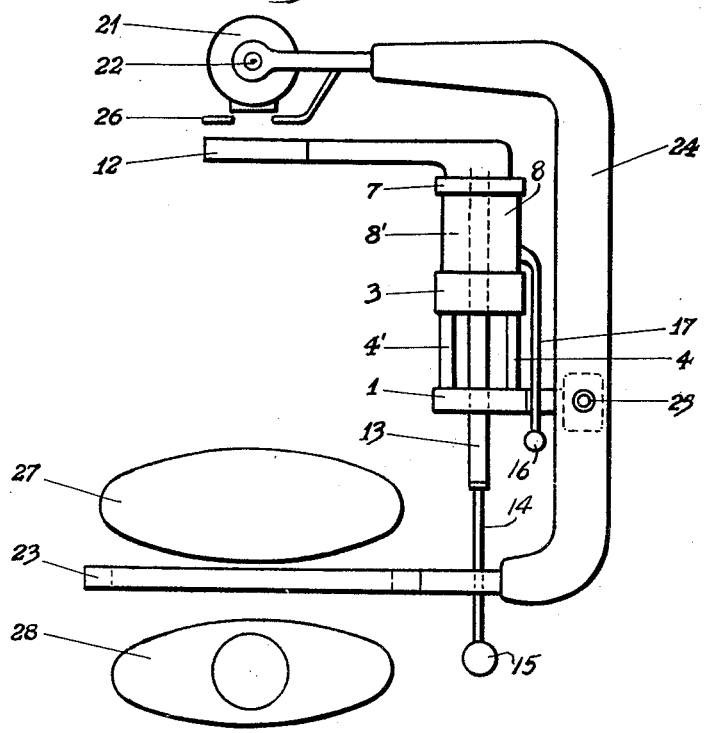

Patented Mar. 27, 1951

2,546,699

UNITED STATES PATENT OFFICE 2,546,699

MOVABLE DIAPHRAGM FOR RADIOSCOPIC APPARATUS

Maurice D. Poittevin, Meudon, France

Application February 14, 1947, Serial No. 728,402
In France February 11, 1946

Section 1, Public Law 690, August 8, 1946
Patent expires February 11, 1966

5 Claims. (Cl. 250—105)

1

The present invention has for its object a device which permits of regulating the opening and the direction of the beam of X rays of a radioscopic apparatus. In accordance with the present invention this is effected by means of a rigid set or assembly hereinafter termed the rigid set constituted by a diaphragm, its housing, and an arm at the extremity of which is disposed an adjusting member for the opening of this diaphragm, this set being guided by a mechanical system which allows the diaphragm to move relatively to the X-ray tube and also relatively to the radiogenic screen by translation only and without rotation relative to the screen and its radiogenic tube, assumed fixed, so that, the displacements for the member for adjusting the opening being the same as those of the diaphragm, this member may serve not only for adjusting the opening but also, by its translation, for the adjustment of the direction of the beam of X rays.

This rigid set is so arranged that, when the diaphragm is moved in its plane, between the focus and the screen and, preferably parallel to the latter, its member for adjusting the opening moves in a plane preferably further from the focus than the screen in order that it may be easily accessible for the operator while he watches this screen. The operator thus has at his disposal a single member for adjusting the opening and the direction of the beam of X rays, of which the displacements are smaller than those of the radioscopic field and always parallel to the latter and these advantages are obtained without any mechanical transformation being necessary to transmit to the diaphragm the translations of the adjusting member.

An apparatus in accordance with the invention may be embodied by employing any suspension device for obtaining the translation without rotation of the rigid set, diaphragm housing adjusting member, for example carriages rolling or sliding on tubes round polygonal single or multiple, and suitably directed, or a system of articulated parallelograms. In particular, there may be employed articulated parallelepipeds juxtaposed on the same axis such as those which will be hereinafter described and which are particularly favourable for obtaining a very great mobility and for taking up very little space.

There may also be employed any device for balancing the movable parts by counterweight and/or springs suitably adapted to the guiding system.

Fig. 1, 2 and 3 illustrate, respectively in side

2 elevation, plan and front view an example of embodiment in accordance with the present invention.

In these figures a member 1 in the form of a frame is provided with a foot 2 fixed to the assemblage radiogenic tube radioscopic screen not illustrated in the figures. A frame 3 is parallel to the frame 1. There are flat and wide rods 4 and 4'. Two parallel axles 5 and 5' are rigidly connected to the frame 1 and on them are hinged the right extremities of the rods 4 and 4'. Two parallel axles 6 and 6' are rigidly connected with the frame 3 and on them are hinged the left extremities of the rods 4 and 4'. The frame 3 can, therefore, move horizontally over a curved path of which the radius is equal to the interaxial distance 5—6 and 5', 6' but always remains parallel to the frame 1.

Frame 7 is parallel to frames 1 and 3. Rods 8 and 8' are flat and wide like rods 4 and 4'. Axles 9 and 9' are rigidly connected with frame 3 and on them are hinged the right ends of rods 8 and 8'. Axles 10 and 10' are rigidly connected with frame 7 and on them are hinged the left ends of rods 8 and 8'. Frame 7 can therefore move vertically through a curved path of which the radius is equal to the interaxial distance 9—10 and 9'—10' but always remains parallel to frame 3.

Frame 7 can, therefore, move horizontally and vertically but always remains parallel to frame 1, that is to say to the radioscopic screen if the axles 5—5', 6—6', 9—9' and 10—10' are in planes parallel to that screen.

It suffices, therefore, to fix the rigid set diaphragm housing-adjusting member on the frame 7 to satisfy the principle previously explained. This fixing may be effected in any manner but it is particularly advantageous to dispose the arm carrying the control member within the assemblages of the two hinged parallelograms formed by the rods 4—4', 8—8' in order to reduce the space taken up by the set and automatically to obtain the limitation of the path of the rigid set by the frames 1 and 3.

The opening of the diaphragm 11 is adjustable. The housing 12 contains in its interior the guiding mechanism of the moving parts of the diaphragm 11, the construction of which is already well known and therefore, are not shown. A tubular arm 13 rigidly connected with the housing 12 forms the journal for the operating rod 14 which terminates in the handle 15, alteration of the opening of the diaphragm 11 being effected by turning the operating rod about its axis. The mechanical device for transforming the turning of the handle 15 into a movement for opening the diaphragm 11, will not be described because it may be constructed on any well known system. It may, in particular, comprise a double handle 15, allowing of independent adjustment of two perpendicularly disposed dimensions of the opening of diaphragm 11.

In order that the rigid set 11 to 15 may be easily movable when the plane of the diaphragm is not horizontal, there may be employed counterweights 16, 16' respectively rigidly connected with the arms 17 and 17' themselves fixed to the rods 8 and 8' or a single one of these counterweights may be used which is rigidly connected with either one of these arms fixed to a single one of these rods. Also, the counterweights may be replaced by suitable springs illustrated in dotted line at 18 and 18', stretched between points 19 and 19', 20, 20' of the rods 8 and 8' so as to apply to these rods couples of which the sum is equal and opposite to the couple resulting from the mass of the movable parts.

In a like manner one of these systems for securing equilibrium or a combination of these systems may also be applied to the rods 4 and 4' if the planes of the axles 5—5' and 6—6' are not vertical.

Lastly the springs may be removable or adjustable as a function of the operating position of the apparatus.

Figs. 4 and 5 illustrate respectively in elevation and in plan the assemblage of the movable diaphragm and its suspension system mounted on a radioscopic apparatus.

In these figures:

An X-ray generator 21 has its focus at 22. A movable frame 23 contains the radioscopic screen (not illustrated). A member 24 serves for assembling generator 21 and frame 23.

The frame 1 and the foot 2 are fixed to the member 24 by means of the bolt 25.

A diaphragm 26 is rigidly fixed to the member 24 and limits the dimensions of the beam of X rays to the dimensions of the screen whatever be the opening and the position of the movable diaphragm 11. The subject and the operator are shown at 27 and 28 respectively.

The shapes of the foot 2 and of the housing 12 are a little different from those in Figures 1, 2 and 3, to facilitate the arrangement of the whole.

It is easily seen from Figures 4 and 5 that the operator 28 can easily adjust the opening and the position of the radioscopic field solely by operating the member 15 and that the ratio of the movements of the radioscopic field to the movements of the single control member 15 is equal to ratio of the distance focus-screen to the distance focus-diaphragm.

The mobility of the rigid assemblage will be very great if the axles 5—5', 6—6', 9—9' and 10—10' are small enough and if the distances 5—6, 5'—6', 9—10 and 9'—10' are large enough, so as to obtain sufficiently small oscillation angles and, in consequence, very reduced losses through friction. It will thus be seen that the member 15 has translatory movements which are the same as those of the diaphragm 11, whereby said member 15 serves by a translatory movement for adjustment of the direction of the X rays and by a non-translatory movement of the adjustment of the opening of the diaphragm 11.

There may be employed for the construction of the rigid set diaphragm housing adjusting member any known system which allows of obtaining diaphragm openings circular, square or rectangular, of fixed or adjustable proportions, in particular systems of transmission by wire or flexible cable called "Bowden" or systems of rods, connections and cranks driving movable shutters slides or articulated parallelograms.

Preferably a system should be chosen allowing of adjusting the opening of the diaphragm by rotation of the control member or by causing appropriate levers to approach or to separate or in a general way, by any movement different from that of translation necessary for the adjustment of the direction of the beam of the X rays.

Devices in accordance with the invention may be employed on radioscopic apparatus of which the radiogenic tube and the radioscopic screen are movable, together or separately and, if necessary, counterbalanced by any known means. In particular these devices may be employed on apparatus in which the set radiogenic-tube radioscopic screen is just vertically displaceable by a rack or analogous system and in a general way in apparatus of which the tube and the screen are of reduced mobility. Apparatus to which the present invention gives new possibilities all the greater as they hitherto have only permitted radioscopic exploration only, under very inconvenient conditions.

Finally, the device in accordance with the present invention may be employed on apparatus of which the screen comprises a single or multiple anti-diffusion grid, centred on the focus of the radiogenic tube, this centring not being effected by the displacements of the diaphragm since the radiogenic focus is fixed relative to the screen.

What I claim and desire to secure by Letters Patent is:

1. A radioscopic apparatus having an X-ray tube, a radioscopic screen in fixed relation to the X-ray tube, a diaphragm between the X-ray tube and the screen, said diaphragm having an adjustable aperture therethrough, a housing in which the diaphragm is mounted, a movable unit comprising said housing and a mechanical system of interconnected members for moving the housing and the diaphragm both transversely and axially in relation to the X-ray tube and to the screen while maintaining a parallel relation between the diaphragm and the screen, said mechanical system of interconnected members comprising a control arm operable at one end from a point in proximity to the screen and connected at its other end to the housing and to the diaphragm carried thereby, and two juxtaposed deformable parallelepipeds articulated in planes perpendicular to each other with the end face of one of the parallelepipeds being parallel to the plane of the housing and rigidly connected to the housing, so that the housing and the diaphragm carried thereby can be displaced in parallel planes as the parallelepipeds are articulated.

2. A radioscopic apparatus according to claim 1 wherein the control arm passes through the interior of the two parallelepipeds.

3. A radioscopic apparatus according to claim 1 wherein the two parallelepipeds are constituted by a common frame, two end frames and two series of rods, the two series of rods being articulated in mutually perpendicular planes.

4. A radioscopic apparatus according to claim 1 wherein the movable unit is provided with counterbalancing means for maintaining the unit in any adjusted position to which it is moved.

5. A radioscopic apparatus according to claim 1 wherein the extremity of the control arm opposite to that which supports the diaphragm and its housing is provided with a handle, rotation of which about the axis of the control arm serves for adjusting the size of the opening in the diaphragm.

MAURICE D. POITTEVIN.

REFERENCES CITED

The following references are of record in the file of this patent:

UNITED STATES PATENTS

| Number | Name | Date |
|---|---|---|
| 1,909,118 | Raab | May 16, 1933 |
| 2,082,965 | Lundquist | June 8, 1937 |
| 2,269,866 | Simon | Jan. 13, 1942 |
| 2,295,975 | Storm | Sept. 15, 1942 |

FOREIGN PATENTS

| Number | Country | Date |
|---|---|---|
| 334,818 | Great Britain | Sept. 11, 1930 |
| 232,766 | Switzerland | Sept. 16, 1944 |